(12) United States Patent
Treadway et al.

(10) Patent No.: US 11,524,600 B2
(45) Date of Patent: Dec. 13, 2022

(54) ELECTRONIC VEHICLE CHARGE REGULATION

(71) Applicant: KYNDRYL, INC., New York, NY (US)

(72) Inventors: Michael Treadway, Keller, TX (US); Shikhar Kwatra, Raleigh, NC (US); Michael Anthony Adams, Bakersfield, CA (US); Michael Millies, Flower Mound, TX (US)

(73) Assignee: KYNDRYL, INC., New York, NY (US)

( * ) Notice: Subject to any disclaimer, the term of this patent is extended or adjusted under 35 U.S.C. 154(b) by 182 days.

(21) Appl. No.: 16/923,206

(22) Filed: Jul. 8, 2020

(65) Prior Publication Data

US 2022/0009369 A1    Jan. 13, 2022

(51) Int. Cl.
*B60L 53/63* (2019.01)
*G06Q 10/02* (2012.01)
(Continued)

(52) U.S. Cl.
CPC ............... *B60L 53/63* (2019.02); *B60L 53/62* (2019.02); *B60L 53/65* (2019.02); *G06Q 10/02* (2013.01)

(58) Field of Classification Search
CPC ......... B60L 53/64; B60L 53/62; B60L 53/65; B60L 53/68; B60L 53/63; B60L 53/67;
(Continued)

(56) References Cited

U.S. PATENT DOCUMENTS 8,825,247 B2 * 9/2014 Kim .................... H02J 7/00047
903/903
9,620,970 B2    4/2017 Gadh
(Continued)

FOREIGN PATENT DOCUMENTS

| CN | 104852475 A | 8/2015 |
| CN | 105966267 A * | 9/2016 |
| IN | 201741026828 A * | 9/2017 |

OTHER PUBLICATIONS

"IBM, Honda, and PG&E Enable Smarter Charging for Electric Vehicles", IBM News room, Armonk, N.Y.—Apr. 12, 2012, 3 pages, <https://www-03.IBM.com/press/us/en/pressrelease/37398.wss>.

(Continued)

*Primary Examiner* — Helen Rossoshek
(74) *Attorney, Agent, or Firm* — Erik Swanson; Andrew M. Calderon; Calderon Safran & Cole P.C.

(57) ABSTRACT

Embodiments of the present invention provide methods, computer program products, and systems. Embodiments of the present invention can be used to partition an area into zones, wherein each zone includes one or more delivery mechanisms and each delivery mechanism include one or more portions that are capable of charging an electric vehicle. Embodiments of the present invention can be used to, in response to receiving a request to charge, reserve a portion of a delivery mechanism for a fixed period of time based on available capacity of the delivery mechanism and need of the requesting electric vehicle. Embodiments of the present invention can be further used to modify the fixed period of time based on real time use of the delivery mechanism.

20 Claims, 7 Drawing Sheets

(51) Int. Cl.
  *B60L 53/65* (2019.01)
  *B60L 53/62* (2019.01)
(58) Field of Classification Search
  CPC .......... B60L 2240/62; B60L 2240/622; G06Q 10/02; G06Q 10/00; G06Q 10/04; Y02T 10/7072
  See application file for complete search history.

(56) References Cited

U.S. PATENT DOCUMENTS

| | | | |
|---|---|---|---|
| 9,778,653 | B1 | 10/2017 | McClintock et al. |
| 10,562,406 | B2 | 2/2020 | Williams |
| 2010/0094496 | A1* | 4/2010 | Hershkovitz ........... B60L 53/14 701/22 |
| 2012/0173292 | A1 | 7/2012 | Solomon |
| 2015/0039391 | A1* | 2/2015 | Hershkovitz ........... B60L 53/65 705/7.31 |
| 2016/0023557 | A1* | 1/2016 | Dimke .................... H02J 7/007 320/108 |
| 2017/0120758 | A1* | 5/2017 | Xu ........................... H02J 50/10 |
| 2017/0136911 | A1* | 5/2017 | Ricci ....................... B60L 55/00 |
| 2018/0065494 | A1 | 3/2018 | Mastrandrea |
| 2018/0238698 | A1* | 8/2018 | Pedersen ............. G05D 1/0088 |
| 2020/0104948 | A1* | 4/2020 | Forbes, Jr. .............. B60L 53/64 |
| 2020/0180433 | A1* | 6/2020 | Hou ........................ B60L 53/14 |
| 2020/0198489 | A1* | 6/2020 | Yoon ...................... B60L 53/36 |
| 2020/0231059 | A1* | 7/2020 | Hishida .................. B60L 53/63 |
| 2020/0235590 | A1* | 7/2020 | Daffern .................. H02J 7/007 |
| 2020/0262305 | A1* | 8/2020 | Chakraborty .... G06Q 20/40155 |
| 2020/0290467 | A1* | 9/2020 | Gao .......................... H02J 7/02 |
| 2021/0284043 | A1* | 9/2021 | Wang ...................... B60L 53/62 |
| 2021/0291684 | A1* | 9/2021 | Takahashi ............... B60L 53/37 |
| 2021/0300189 | A1* | 9/2021 | Treadway ............... B60L 53/12 |
| 2021/0302182 | A1* | 9/2021 | Treadway .......... G01C 21/3469 |
| 2021/0305488 | A1* | 9/2021 | Sun ........................ H01L 41/113 |
| 2022/0012648 | A1* | 1/2022 | Uenoyama ............. G06Q 10/02 |

OTHER PUBLICATIONS

"Innovation at the speed of tomorrow", Qualcomm, © 2020 Qualcomm Technologies, Inc., 14 pages, <https://www.qualcomm.com/products/automotive>.

"The shift to electric vehicles", Putting consumers in the driver's seat, IBM Global Business Services, Executive Summary, © Copyright IBM Corporation 2011, 4 pages.

Afridi, Khurram, "Wireless Charging of Electric Vehicles", Frontiers of Engineering Reports on Leading-Edge Engineering from the 2017 Symposium, Copyright© National Academy of Sciences., 9 pages.

Boeriu, Horatiu, "BMW Wireless Charging: 530e from 2018 with inductive charging", Apr. 27, 2017, 5 Pages, <https://www.bmwblog.com/2017/04/27/bmw-wireless-charging-530>.

Choi et al., "Advances in Wireless Power Transfer Systems for Roadway-Powered Electric Vehicles", IEEE Journal of Emerging and Selected Topics in Power Electronics, vol. 3, No. 1, Mar. 2015, 19 pages.

Panchal et al., "Review of static and dynamic wireless electric vehicle charging system", Engineering Science and Technology, an International Journal 21 (2018), Available online Jun. 27, 2018, 16 pages, <https://doi.org/10.1016/j.iestch.2018.06.015>.

* cited by examiner

| TIME | ENTITY | ACTION | CAPACITY |
|---|---|---|---|
| 1 | | | 100 |
| 2 | EV A | REQUEST (AGENT=A, POWER=40) | 100 |
| 2 | CONTROLLER | RESPOND (AGENT=A, EXPIRES=5) | 60 |
| 3 | EV B | REQUEST (AGENT=B, POWER=40) | 60 |
| 3 | CONTROLLER | RESPOND (AGENT=B, EXPIRES=6) | 20 |
| 4 | EV C | REQUEST (AGENT=C, POWER=40) | 20 |
| 5 | EV A | STOPS CHARGING, LEASE EXPIRED | 60 |
| 5 | CONTROLLER | RESPOND (AGENT=C, EXPIRES=8) | 20 |
| 6 | EV B | STOPS CHARGING, LEASE EXPIRED | 60 |
| 7 | EV A, EV B | LEAVE ZONE | 60 |
| 8 | EV C | STOPS CHARGING, LEASE EXPIRED | 100 |

```
var CAPACITY = ACTUAL_CAPACITY - BUFFER;
var CURRENT;

const LEASE_LENGTH;
const WAITING = []; //FIFO Queue
const CHARGING = []; //FIFO Queue // Called when an agent requests access to charge
request(agent_id, power) {
   if (isPriority(agent_id)) {
      // Place at the top of the list
      WAITING.unshift({ agent_id, power });
   } else {
      WAITING.push({ agent_id, power });
   }
}

// Called at regular periodic intervals
timer(){
   // Evict retired leases
   var l = CHARGING.peek();
   while(l && l.expires < now){
      CHARGING.pop();
      l = CHARGING.peek();
   }
   // Add in those that are waiting up until CAPACITY
   var r = WAITING.peek();
```

```
while(r) {
    if (r.power + CURRENT < CAPACITY){
        r = WAITING.pop();
        r.expires = now + LEASE_LENGTH;
        CURRENT += r.power;
        respond(r.agent_id, r.expires);
        CHARGING.push(r);
    } else {
        break;
    }
    r = WAITING.peek();
  }
}
respond(agent_id, expires) {
    broadcast(agent_id, expires);
}
// Called at regular intervals with actual power consumption
power_consumption(reading) {
    CURRENT = reading;
}
isPriority(agent_id) {
    // Determine if the unique ID of the agent is considered high priority.
}
```

ELECTRONIC VEHICLE CHARGE REGULATION

BACKGROUND

The present invention relates generally to wireless charging of electronic vehicles, and more particularly to improving charging of electronic vehicles.

An electric vehicle charging station, also called EV charging station, typically refers to an infrastructure that supplies electric energy for the recharging of plug-in electric vehicles—including electric cars, neighborhood electric vehicles and plug-in hybrids.

For charging at home or work, some electric vehicles have converters on board that can plug into a standard electrical outlet or a high-capacity appliance outlet. Others either require or can use a charging station that provides electrical conversion, monitoring, or safety functionality. Many charging stations support faster charging at higher voltages and currents than are available from residential charging stations. Public charging stations are typically on-street facilities provided by electric utility companies or located at retail shopping centers, restaurants and parking places, operated by a range of companies.

Charging stations provide a range of heavy duty or special connectors that conform to the variety of standards. For common DC rapid charging, multi-standard chargers equipped with two or three of the Combined Charging System (CCS), CHAdeMO, and AC fast charging has become the de facto market standard in many regions. In some cases, some roads can include charging technology that supports "charging while driving".

SUMMARY

Embodiments of the present invention provide computer-implemented methods, computer program products and systems. In one embodiment of the present invention, a computer-implemented method is provided for partitioning an area into zones, wherein each zone includes one or more delivery mechanisms and each delivery mechanism include one or more portions that are capable of charging an electric vehicle; in response to receiving a request to charge, reserving a portion of a delivery mechanism for a fixed period of time based on available capacity of the delivery mechanism and need of the requesting electric vehicle; and modifying the fixed period of time based on real time use of the delivery mechanism.

BRIEF DESCRIPTION OF THE DRAWINGS

FIG. 3 is a table depicting received requests, actions, and capacity of a delivery mechanism, in accordance with an embodiment of the present invention;

FIGS. 4A and 4B are an example script, in accordance with an embodiment of the present invention.

DETAILED DESCRIPTION

Figure 6:
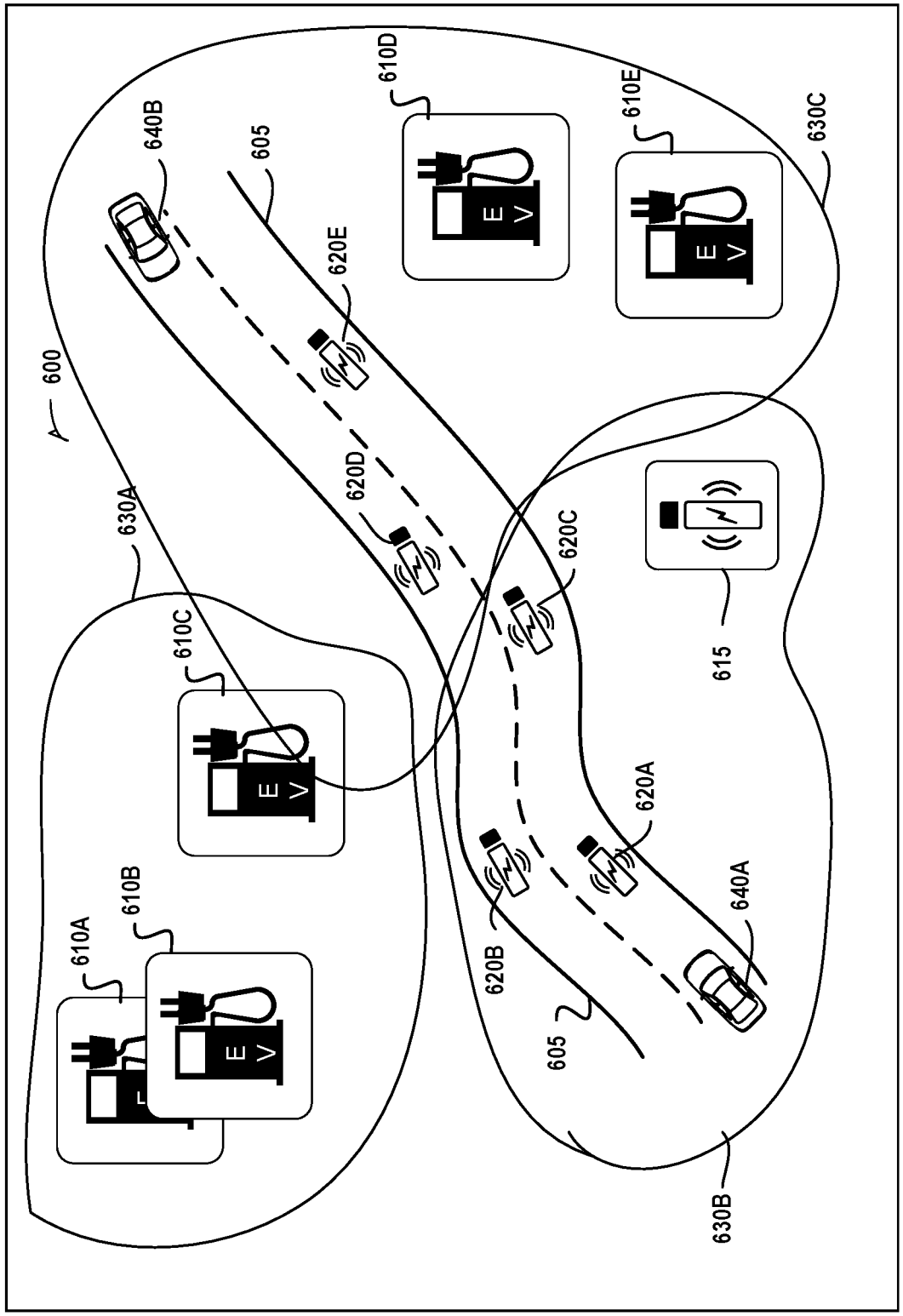
FIG. 6 depicts a block diagram showing a geolocation area having a network of available delivery mechanisms with charging delivery mechanisms partitioned into zones.

FIG. 6 is a block diagram showing a geolocation area having a network of available delivery mechanisms (i.e., a delivery mechanism network) 600 with charging delivery mechanisms partitioned into zones. Embodiments of the present invention recognize deficiencies in use of charging stations. Often, they can become crowded and develop long queue times during peak hours and periods of travel. Embodiments of the present invention also recognize that there are roads 605 that enable electronic vehicles to charge while driving. These roads enable a contactless method for charging an electronic vehicle. Electronic vehicles may naturally seek the use of these roads which would lead to a congestion. Embodiments of the present invention recognize that the increased strain from stationary charging stations 610A-E and contactless, mobile charging stations 620A-E (e.g., a road 605 that supports charging an electronic vehicle while driving) needs to be managed. Accordingly, embodiments of the present invention provide solutions for managing charge and electric grids. For example, embodiments of the present invention can manage charging stations 610A-E, 620A-E, 615 to reduce congestion by partitioning delivery mechanisms into zones 630A-C. In this way, embodiments of the present invention can create boundaries for an electric grid. Embodiments of the present invention can then allocate and route vehicles 640A-B to one or more delivery mechanisms 610A-E, 620A-E, 615 based on capacity (e.g., available capacity to charge a vehicle), time requested, and predicted time needed to complete a charge. In this manner, as described in greater detail later in this specification, embodiments of the present invention provide a distributed and priority aware method for enabling a limited permission to charge within a zone 630A-C, giving an equal, first come, first serve access to non-prioritized requesters.

As used herein, a delivery mechanism 610A-E, 620A-E, 615 refers to a mechanism in which an electronic vehicle receives charge. In this embodiment, a delivery mechanism can refer solely to wireless methods of charging (e.g., a charging mat 615, a road 605 that has enabled wireless charging 620A-E, etc.). A delivery mechanism can also refer to traditional electronic charging stations 610A-E that support both slow and fast charging of a vehicle.

Embodiments of the present invention presents users an opt-in/opt-out mechanism that enables a user to participate in the charging service. In some embodiments, users can be notified when data is collected and/or otherwise used (e.g., vehicle information such as current charge, estimated time to charge, destinations, route to destination, waypoints, average power consumption, etc.).

Figure 1:
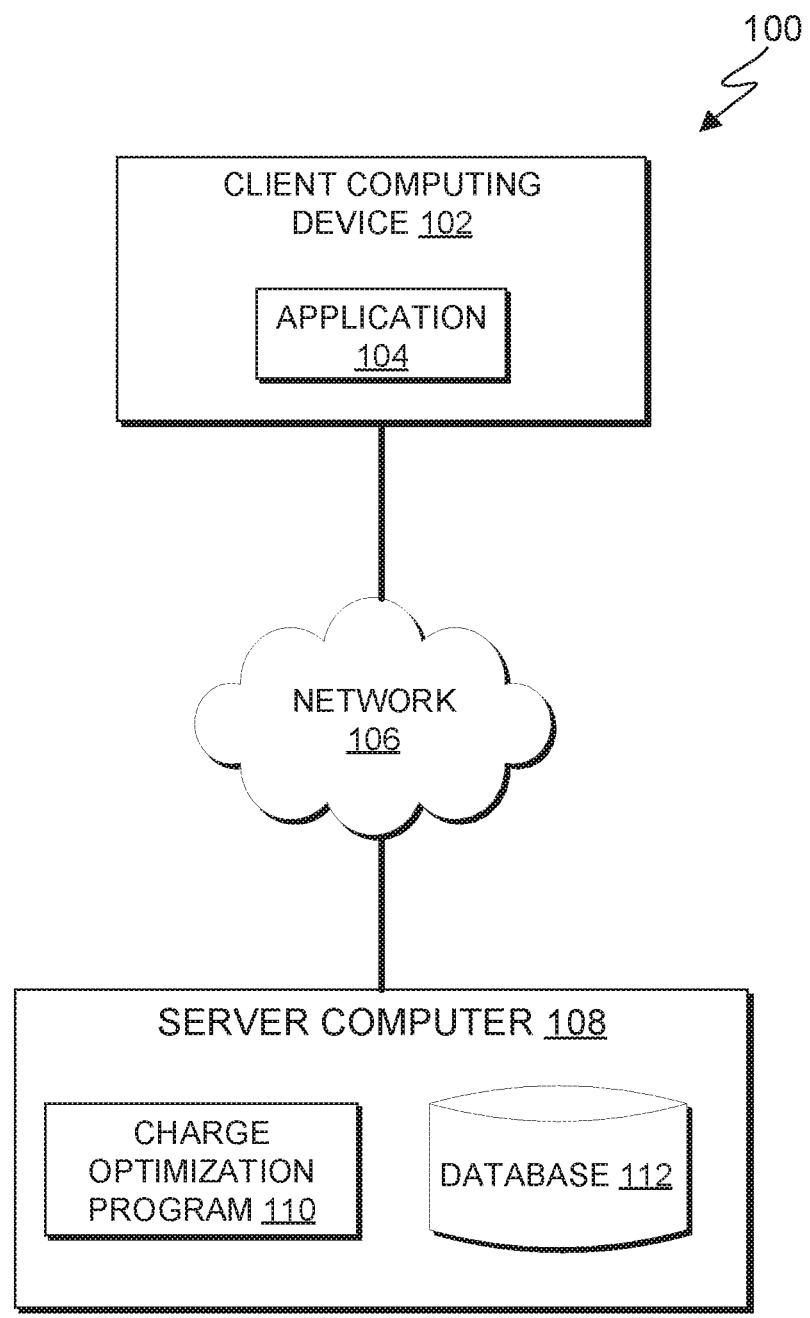
FIG. 1 is a functional block diagram illustrating a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 5.

In this embodiment, client computing device 102 is an electronic vehicle (e.g., a digital device) associated with a user and includes application 104. Application 104 communicates with server computer 108 to access charge optimization program 110 (e.g., using TCP/IP) to access user and vehicle information. Application 104 can further communicate with charge optimization program 110 to transmit instructions to divide area 600 into zones 630A-C (FIG. 6), receive requests for charge, identify a delivery mechanism 610A-E, 620A-E, 615 (FIG. 6), and optimize a delivery mechanism network, as discussed in greater detail with regard to FIGS. 2-6.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts charge optimization program 110 and database 112. In this embodiment, charge optimization program 110 resides on server computer 108 and can be implemented in a 5G infrastructure that interacts with cloud computing servers. In other embodiments, charge optimization program 110 can have an instance of the program (not shown) stored locally on client computer device 102. In yet other embodiments, charge optimization program 110 can be stored on any number or computing devices (e.g., a delivery mechanisms such as stationary or mobile charging stations, a smart device, electronic vehicles with communications capability).

In this embodiment, charge optimization program 110 divides areas into zones 630A-C (FIG. 6), and in response to receiving a request to charge, identify a delivery mechanism 610A-E, 620A-E, 615. In this embodiment, charge optimization program 110 identifies a delivery mechanism based on the charge needed of the requesting device, the location of the requesting device, the route the requesting device is currently on, and available capacity for delivery mechanisms in a delivery mechanism network (e.g., zones 630A-C). In this embodiment, charge optimization program 110 can measure actual load (e.g., charge) from one or more Internet of Things (IoT) devices at regularly scheduled time intervals.

In this embodiment, charge optimization program 110 can receive requests for reservations to use a specific delivery mechanism. For example, a requesting vehicle can request delivery mechanisms along a generated route. In this embodiment, charge optimization program 110 can receive the vehicle's ID, and estimated amount of power the vehicle would like or would need. In some embodiments, the user may specify an estimate of how much charge they might need, what time the user would arrive at the delivery mechanism, and an amount of time the user has to charge. In other embodiments, charge optimization program 110 can estimate or otherwise predict an amount of time the user will have to charge and a time period the user will arrive at the delivery mechanism.

Charge optimization program 110 can then put the requesting vehicle into a queue of vehicles waiting to be charged. In some embodiments, charge optimization program 110 can prioritize requesters (e.g., vehicles) using a priority score. In this embodiment, charge optimization program 110 utilizes a numeric scale where higher numbers indicate a greater priority and lower numbers indicate a lesser priority. For example, where the priority scale ranges from one to five, a score of 5 would indicate the highest priority. In this embodiment, emergency vehicles are given the highest priority. generates insights and recommendations by identifying applications installed in a user device and identifying attributes within the applications. In this embodiment, charge optimization program 110 can offer a subscription-based service that allows a user to receive a higher priority ranking. In other embodiments, charge optimization program 110 can rank vehicles having a charge level below ten percent a higher priority ranking (e.g., at least a four out of the five).

Charge optimization program 110 maintains an optimal load for each delivery mechanism in a network of delivery mechanism by managing reservations (e.g., reservation times, charging periods, list of vehicles charging, vehicles in a queue waiting for charge, charging capacity of the delivery mechanism, charging capacity of the vehicle waiting to be charge, current load of the delivery mechanism, configured length of reservation, etc.).

At periodic intervals, charge optimization program 110 can cycle over existing leases (e.g., existing reservations) and remove reservations that have expired. Charge optimization program 110 can cycle to a list of vehicles in a queue for charging (e.g., a waiting list) and can notify each vehicle in the list with a scheduled reservation until charging capacity is reached. Charge optimization program 110 can also maintain a list of vehicles that have been granted reservations and similarly can maintain a list of completed reservations.

In embodiments where charging capacity is reached or exceeded, charge optimization program 110 can prevent new vehicles from charging. Charge optimization program 110 can delay responses (e.g., delay approvals to charge) until vehicles currently charging either stopped charging or left the delivery mechanism.

In this embodiment, database 112 functions as a repository for stored content. In this embodiment, content includes user profiles, device profiles and persona profiles. In some embodiments, database 112 can include ticket history or requests to participate in application and device improvement. Database 112 can reside on a cloud infrastructure and stores user generated information. In some embodiments, database 112 can function as a repository for one or more files containing user information. In this embodiment, database 112 is stored on server computer 108 however, database 112 can be stored on a combination of other computing devices (not shown) and/or one or more components of computing environment 100 (e.g., client computing device 102) and/or other databases that has given permission access to Charge optimization program 110.

In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2:
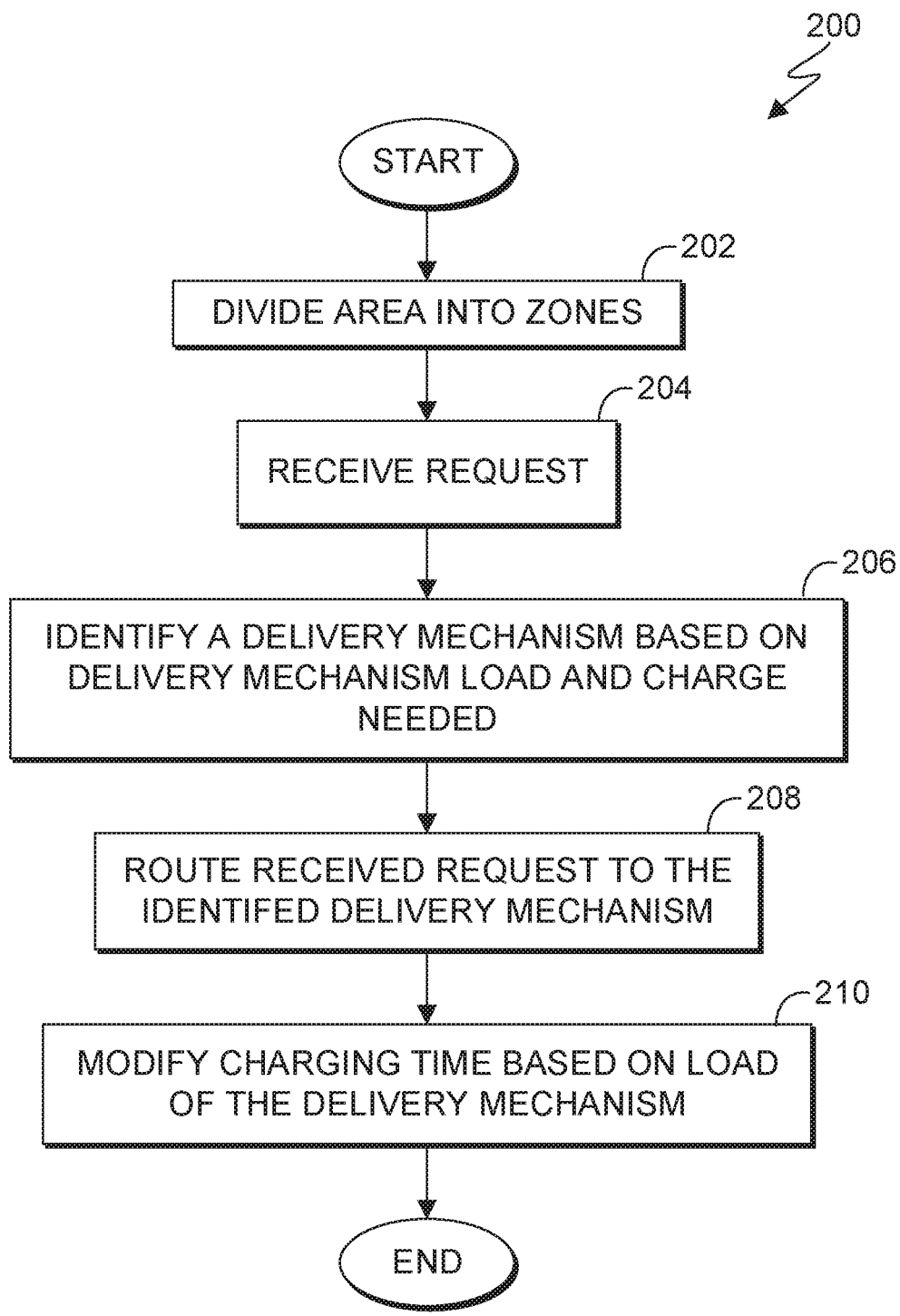
FIG. 2 is a flowchart depicting operational steps for managing charge capacity of a delivery mechanism, in accordance with an embodiment of the present invention.

FIG. 2 is a flowchart depicting operational steps for managing charge capacity of a charging station, in accordance with an embodiment of the present invention.

In step 202, charge optimization program 110 divides areas into zones. In this embodiment, charge optimization program 110 divides areas into zones based on an amount of delivery mechanisms in an area. In certain embodiments, charge optimization program 110 can also consider the capabilities of the delivery mechanism. In yet other embodiments, charge optimization program 110 divides areas into zones to have an equal charging capacity (e.g., each zone can have at least two charging mechanisms).

In other embodiments, charge optimization program 110 can dynamically divide areas into zones to reapportion certain delivery mechanisms into other zones based on the number of vehicles requesting charge. For example, during peak times, charge optimization program 110 can reapportion a delivery mechanism into another zone or re-route a vehicle to a different zone and into a different delivery mechanism to fulfill the charge request.

In step 204, charge optimization program 110 receives a request to charge. In this embodiment, charge optimization program 110 receives a request to charge from one or more electric vehicles needing charge. In this embodiment a request can include user and vehicle information. In this embodiment, charge optimization program 110 receives information by transmitting instructions to an agent installed on client computing device 102 to transmit information to charge optimization program 110. In this embodiment, user and vehicle information can include performance metrics can include response time, channel capacity, latency, completion time, service time, bandwidth, relative efficiency, etc. Information can also include user preferences and behavior (e.g., user specified information regarding reservation times, charging periods, charging preferences, etc.). Information can also include vehicle identification numbers (or similar unique device identification) attribute information for each application installed on the user device (e.g., client computing device 102). Information can include version information, patches installed, operating systems used, etc.

Charge optimization program 110 can then add the received request to a list of queued vehicles requesting a reservation (e.g., a waitlist that adds requesting vehicles to a queue of requesting vehicles). In this embodiment, a reservation can include a request to charge at a particular time for a particular length. In this embodiment, the waitlist can include received information (e.g., vehicle identification or unique ID, current charge levels, requested amount of charge, estimated time to charge, etc.)

In step 206, charge optimization program 110 identifies a delivery mechanism based on the delivery mechanism load and charge needed. In this embodiment, charge optimization program 110 identifies a delivery mechanism by identifying a delivery mechanism along the user's generated route (e.g., along the route the requesting vehicle is taking). In this embodiment, charge optimization program 110 can access or otherwise be given permissioned access to a user's route from a navigation service application. Charge optimization program 110 can then access a network of delivery mechanisms and receive real time updates as to each delivery mechanism's current capacity (e.g., remaining available space to accept new vehicles for charge).

Charge optimization program 110 can then use a combination of machine learning and artificial intelligence algorithms to determine an optimal delivery mechanism to satisfy the request that is along the route the user's route. For example, charge optimization program 110 can identify that a delivery mechanism (e.g., a road supporting wireless charge, for example delivery mechanism A) is along the user's route. Charge optimization program 110 can also identify that delivery mechanism A is about to reach its capacity (e.g., enough cars connected to the delivery mechanism to cause a slow down in traffic or enough cars connected to the delivery mechanism such that no additional charge can be supported). Charge optimization program 110 can then select and identify delivery mechanism B along a parallel path to fulfill the charge request.

In step 208, charge optimization program 110 routes the received request to the identified delivery mechanism. In this embodiment, charge optimization program 110 routes the received request to the identified delivery mechanism by interfacing with an existing navigation service to transmit instructions to the requesting vehicle.

In step 210, charge optimization program 110 can modify charging time based on the load of the delivery mechanism. In this embodiment, charge optimization program 110 can modify charging time based on the load experienced by the delivery mechanism. For example, charge optimization program can modify a charging time to either shorten an amount of time for charging by stopping the charge immediately or shortening a reservation period by a fixed amount of time (e.g., five minutes) to make room for another vehicle. In certain embodiments, charge optimization program 110 can modify the charging time based on a percentage of charge being reached by the currently charging vehicle. For example, if the requesting vehicle requests 100 percent charge but specifies that the user can accept a charge of 80% (e.g., that the user can accept with ceasing charging functions when the user's vehicle is charged to 80%), then charge optimization can transmit a request and, in response to a confirmation from a user, cease charging operations on the vehicle. In other embodiments, charge optimization program 110 can calculate the percentage based, at least in part, on the vehicle's current route and destination. For example, charge optimization program 110 can calculate the amount of charge needed for a vehicle to make it to its intended destination and cease charging functions once that charge level is reached (i.e., achieved). Conversely, charge optimization program 110 can add (i.e., lengthen) the charging time to accommodate a user's original request in response to determining that the delivery mechanism has additional capacity.

Specifically, in certain embodiments, charge optimization program 110 can modify the charge time of a vehicle that is within a certain percentage of the requested charge. For example, vehicle A could have entered the delivery mechanism at 60% and requesting a charge to 100%. In this example, vehicle A is currently reading a charge of 80%. In this example, charge optimization program 110 can identify that the delivery mechanism is reaching its specified threshold of 90% capacity. Charge optimization program 110 can further receive a request to charge on this specific road.

In this example, charge optimization program 110 can reference a list of currently charging vehicles and identify that vehicle A has reached 80%. In this example, charge optimization program 110 can identify that a vehicle A has reached an acceptable amount of charge to reach vehicle A's current destination. Charge optimization program 110 can then modify vehicle A's charge time by stopping the charge. Accordingly, charging optimization program 110 can then free up capacity to receive and process another request to charge.

In scenarios where charge optimization program 110 modifies the charge time of a vehicle to manage capacity and load of a delivery mechanism, charge optimization program 110 can transmit a message to the charging vehicle that it needs to modify the charge (e.g., throttle down the charge rate or stop the charge). For example, charge optimization program 110 can transmit a notification that the charge is being stopped and optionally routes the vehicle to another delivery mechanism. In certain embodiments, charge optimization program 110 can offer incentives to vehicles to choose to continue charging or end charging before the desired charge level is reached.

FIG. 3 is a table depicting received requests, actions, and capacity of a delivery mechanism, in accordance with an embodiment of the present invention.

FIG. 3 depicts Table 302. Table 302 details an entry log for delivery mechanism A. Delivery mechanism A is a road charging mechanism that supports wireless charging of electronic vehicles. Table 302 includes a list of entries in a sequence (e.g., time), entities requesting charge, actions taken, and capacity of a delivery mechanism.

In this example table, three electronic vehicles EV A, EV B, and EV C have requested charge. For example, at Time 1 (e.g., the first entry) there are no entities or actions taken. Charge optimization program 110 (e.g., controller) shows capacity of delivery mechanism A is at 100%.

At Time 2 (e.g., the second entry) EV A requests a charge and is at power level sixty and needs forty percent charge. In other words, EV A's request will introduce a load of 40 on the charging controller. This "load" could be a percentage, or AMPS, or any other quantifiable means that the controller can use to deduct from the overall capacity of the delivery mechanism (e.g., zone). At Time 2, capacity is shown at 100%. In the same time period, Time 2, controller (e.g., charge optimization program 110) responds to EV A via EV A's agent allowing EV A to charge, granting it a reservation. Charge optimization program 110 puts an expiration period of five. In this example, the expiration period is measured in units of time. In some embodiments, the expiration period can be measured in terms of charging cycles or periods that the delivery mechanism can accept (e.g., an expiration period of five could mean that charging would stop after the delivery mechanism accepts five additional vehicles).

At Time 3 EV B requests charge will introduce a load of forty to the delivery mechanism. Capacity for delivery mechanism A reads sixty percent. At Time 3, controller responds and grants EV B a reservation (e.g., granting it charge) and puts an expiration value of 6. The capacity for delivery mechanism A is twenty percent.

At Time 4, EV C requests charge and will introduce a load of forty percent on the delivery mechanism. In this example, the capacity for charge is below what delivery mechanism can accommodate. In other words, controller does not immediately grant or respond to EV C's request.

At Time 5, EV A has finished charging as its reservation (i.e., lease) has expired. Charge optimization program 110 then acknowledges that delivery mechanism is showing a capacity reading of sixty percent. In the same time interval, controller responds to EV C and grants EV C a reservation and marks the expiration period value of eight. Charge optimization program 110 can then read that the capacity of delivery mechanism A is at twenty percent.

At Time 6, EV B stops charging as the reservation or lease has expired. Charge optimization program 110 reads delivery mechanism A's capacity reads at sixty percent.

At Time 7, charge optimization program 110 shows that EV A and EV B has left the charging zone (e.g., delivery mechanism A) and delivery mechanism A's capacity shows at sixty percent.

At Time 8, charge optimization program 110 shows that EV C has stopped charging because the reservation has completed. Charge optimization program 110 can then read that delivery mechanism A's capacity is at 100%.

FIGS. 4A and 4B are an example script, in accordance with an embodiment of the present invention.

Example script 402A depicts variables being considered such as actual capacity of a delivery mechanism, current capacity, and buffers. Script 402 also depicts constant variables like lease length, waiting periods, and currently charging vehicles. Script 402A receives a request from an agent of an electronic vehicle needing charge. In the event a requesting vehicle is a priority or emergency vehicle, the requesting vehicle is prioritized or otherwise put on the top of the charge list.

At regular intervals, script 402A enables charge optimization program 110 to evict retired leases (e.g., stop or modify reservations) and to allow charge optimization program 110 to identify current charge capacity of the delivery mechanism and add subsequent requests to the currently charging list as capacity of the delivery mechanism allows.

Script 402B is a continuation of script 402A provides instructions for charge optimization program 110 to respond and add a vehicle if power and current load (e.g., charging) is less than capacity of the delivery mechanism. If power and current load meets or exceeds the capacity of the delivery mechanism, charge optimization program 110 waits until reservations are complete or expires. Script 402B can call (e.g., request information) from the delivery mechanism (e.g., to identify current capacity). Script 402B can also prioritize requesting vehicles (e.g., paid priority or emergency vehicles).

Figure 5:
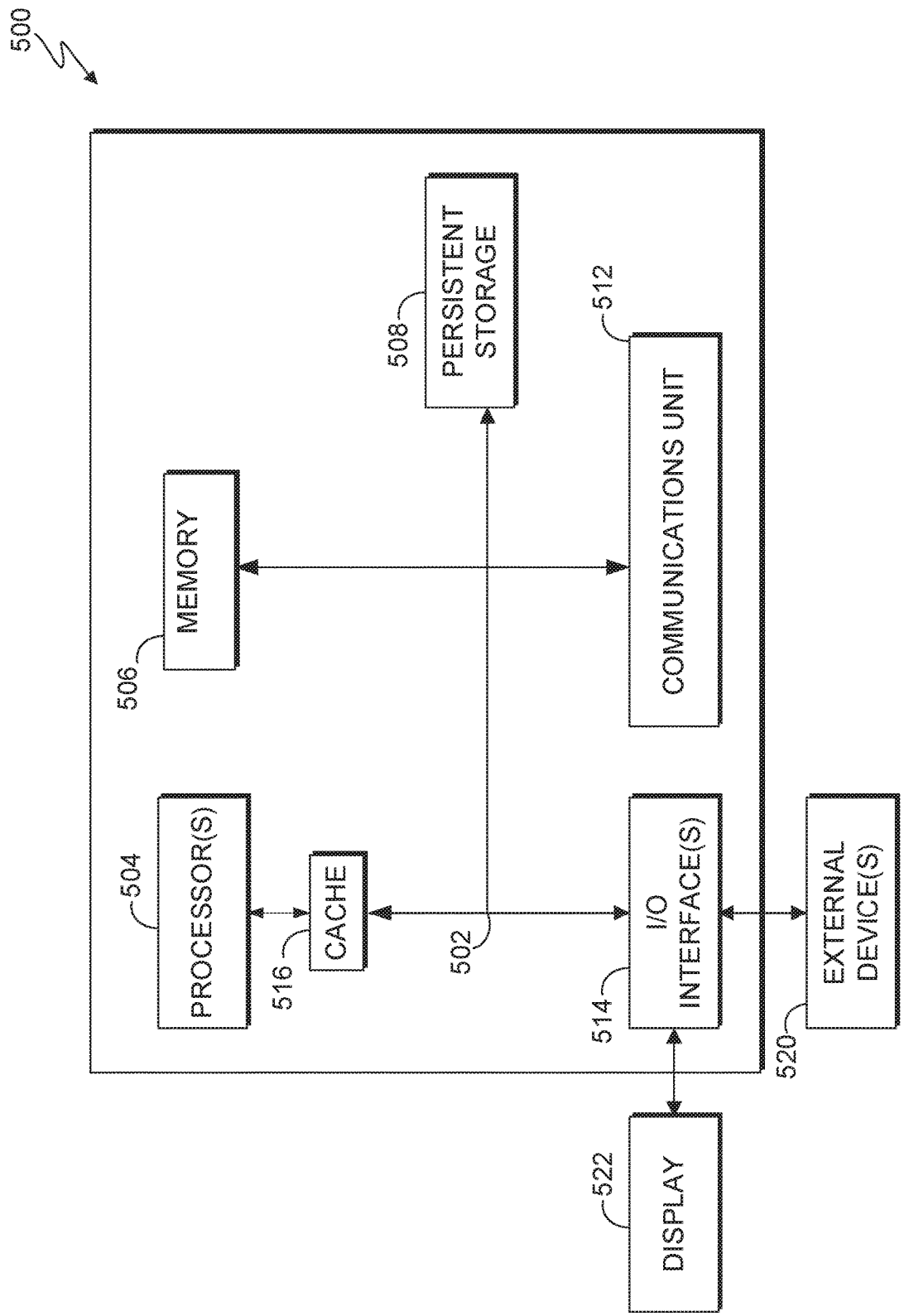
FIG. 5 depicts a block diagram of components of the computing systems of FIG. 1, in accordance with an embodiment of the present invention.

FIG. 5 depicts a block diagram of components of computing systems within computing environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 500 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Charge optimization program 110 (not shown) may be stored in persistent storage 508 and in memory 506 for execution by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 810 includes one or more network interface cards. Communications unit 510 may provide communications through the use of either or both physical and wireless communications links. Charge optimization program 110 may be downloaded to persistent storage 508 through communications unit 510.

I/O interface(s) 512 allows for input and output of data with other devices that may be connected to client computing device and/or server computer. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., charge optimization program 110, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   partitioning an area into zones, wherein each zone includes one or more delivery mechanisms of a plurality of delivery mechanisms and each delivery mechanism includes one or more portions of capacity that are capable of charging an electric vehicle,
   the one or more delivery mechanisms comprising at least one of a wired stationary charging station, a wireless stationary charging station and a series of wireless charging stations embedded in at least one road, and the electric vehicle is stationary when receiving a charge from one of the wired stationary charging station and the wireless stationary charging station, and the electric vehicle is mobile when receiving a charge from the series of wireless charging stations embedded in at least one road;
   in response to receiving a request to charge which comprises information about the electric vehicle including a current location and a current route, reserving a portion of capacity of a delivery mechanism for a fixed period of time based on available capacity of the delivery mechanism in the plurality of delivery mechanisms, need of the electric vehicle requesting a charge, and the current location and the current route information, the reserving enabled to reserve a delivery mechanism of types including wired stationary charging stations, wireless stationary charging stations and a series of wireless charging stations embedded in a road;
   in response to determining that the requesting electric vehicle cannot be granted a reservation to charge due to a lack of capacity of the delivery mechanism, identifying at least one currently charging electric vehicle charging from the delivery mechanism that is within a percentage threshold of requested charge;
   stopping charge to the at least one currently charging electric vehicle;
   reallocating a portion of capacity of the delivery mechanism in use by the electric vehicle having a stopped charge to the requesting electric vehicle; and
   modifying the fixed period of time based on real time use of the delivery mechanism.

2. The computer-implemented method of claim 1, further comprising:
   adding the electric vehicle requesting a charge to a queue of vehicles requesting charge; and
   determining whether the requesting electric vehicle can be granted a reservation to charge in the delivery mechanism.

3. The computer-implemented method of claim 2, further comprising:
   in response to adding the electric vehicle to the queue of vehicles requesting a charge, identifying a delivery mechanism comprising a series of wireless charging stations embedded in at least one road along the current route; and
   in response to determining that the requesting electric vehicle can be granted the reservation to charge in the delivery mechanism, routing the requesting electric vehicle to the delivery mechanism.

4. The computer-implemented method of claim 1, wherein, in response to receiving a request to charge, reserving a portion of capacity of the delivery mechanism for a fixed period of time based on available capacity of a delivery mechanism in the plurality of delivery mechanisms and need of the electric vehicle requesting a charge, wherein the reserving further comprises:
  identifying a delivery mechanism within the area that is along the electric vehicle's current route;
  determining whether the electric vehicle can be granted a reservation to charge in the identified delivery mechanism; and
  in response to determining that the electric vehicle cannot be granted a reservation to charge, identifying another delivery mechanism along the electric vehicle's current route that can accommodate the electric vehicle requesting charge.

5. The computer-implemented method of claim 4, wherein the percent threshold of requested charge is sufficient to allow the currently charging vehicle to complete a planned route without the charge fully depleting.

6. The computer-implemented method of claim 1, further comprising:
  in response to receiving a request to charge, identifying whether the requesting electric vehicle is a priority vehicle.

7. The computer-implemented method of claim 1, wherein modifying the fixed period of time based on real time use of the delivery mechanism comprises:
  adding or shortening the fixed period of time for charging based on a percentage of charge that a currently charging vehicle has achieved,
  wherein modifying the fixed period of time by shortening is dependent on whether the percentage of charge is sufficient to enable the electric vehicle to either reach a destination of the current route or reach a new delivery mechanism capable of providing additional charge to the electric vehicle.

8. A computer program product comprising:
  one or more computer readable storage media and program instructions stored on the one or more computer readable storage media, the program instructions comprising:
  program instructions to partition an area into zones, wherein each zone includes one or more delivery mechanisms of a plurality of delivery mechanisms, and each delivery mechanism includes one or more portions of capacity that are capable of charging an electric vehicle,
  the one or more delivery mechanisms comprising at least one of a wired stationary charging station, a wireless stationary charging station and a series of wireless charging stations embedded in at least one road, and the electric vehicle is stationary when receiving a charge from one of the wired stationary charging station and the wireless stationary charging station, and the electric vehicle is mobile when receiving a charge from the series of wireless charging stations embedded in at least one road;
  program instructions to, in response to receiving a request to charge, reserve a portion of capacity of a delivery mechanism for a fixed period of time based on available capacity of the delivery mechanism in the plurality of delivery mechanisms and need of the electric vehicle requesting a charge;
  program instructions to:
    stop a charge of a currently charging electric vehicle, the currently charging electric vehicle being charged by a delivery mechanism along the route of the requesting electric vehicle, and
    reallocate a portion of the capacity of the delivery mechanism in use by the electric vehicle having a stopped charge to the requesting electric vehicle, wherein the currently charging vehicle is within a percentage threshold of requested charge; and
  program instructions to modify the fixed period of time based on real time use of the delivery mechanism.

9. The computer program product of claim 8, wherein the program instructions stored on the one or more computer readable storage media further comprise:
  program instructions to add the electric vehicle requesting a charge to a queue of vehicles requesting charge; and
  program instructions to determine whether the requesting electric vehicle can be granted a reservation to charge in the delivery mechanism.

10. The computer program product of claim 9, wherein the program instructions stored on the one or more computer readable storage media further comprise:
  program instructions to, in response to determining that the requesting electric vehicle can be granted the reservation to charge in the delivery mechanism, route the requesting electric vehicle to the delivery mechanism.

11. The computer program product of claim 8, wherein program instructions to, in response to receiving a request to charge, reserve a portion of capacity of a delivery mechanism for a fixed period of time based on available capacity of the delivery mechanism in the plurality of delivery mechanisms and need of the electric vehicle requesting a charge comprise:
  program instructions to identify a delivery mechanism within the area that is along the electric vehicle's current route;
  program instructions to determine whether the electric vehicle can be granted a reservation to charge in the identified delivery mechanism; and
  program instructions to, in response to determining that the electric vehicle cannot be granted a reservation to charge, identify another delivery mechanism along the electric vehicle's current route that can accommodate the electric vehicle requesting charge.

12. The computer program product of claim 11, wherein the percent threshold of requested charge is sufficient to allow the currently charging vehicle to complete a planned route without the charge fully depleting.

13. The computer program product of claim 12, wherein the program instructions to modify the fixed period of time based on real time use of the delivery mechanism comprise:
  program instructions to add or shorten the fixed period of time for charging based on a percentage of charge that a currently charging vehicle has achieved.

14. The computer program product of claim 8, wherein the program instructions stored on the one or more computer readable storage media further comprise:
  program instructions to, in response to receiving a request to charge, identify whether the requesting electric vehicle is a priority vehicle.

15. A computer system comprising:
  one or more computer processors;
  one or more computer readable storage media; and program instructions stored on the one or more computer readable storage media for execution by at least one of the one or more computer processors, the program instructions comprising:

program instructions to partition an area into zones, wherein each zone includes one or more delivery mechanisms of a plurality of delivery mechanisms, and each delivery mechanism includes one or more portions of capacity that are capable of charging an electric vehicle, the one or more delivery mechanisms comprising at least one of a wired stationary charging station, a wireless stationary charging station and a series of wireless charging stations embedded in at least one road, and the series of wireless charging stations include at least one stationary contactless charging station that supports charging of a moving electric vehicle, and;

program instructions to, in response to receiving a request to charge, the request comprising information about the electric vehicle including a current location and a current route, reserve a portion of capacity of a delivery mechanism for a fixed period of time based on available capacity of the delivery mechanism in the plurality of delivery mechanisms, the location and the current route, and need of the electric vehicle requesting a charge;

program instructions to, in response to determining that the requesting electric vehicle cannot be granted a reservation to charge when delivery mechanisms along the route of the requesting electric vehicle have insufficient capacity or are reserved by another currently charging vehicle, identify at least one currently charging electric vehicle along the route of the requesting electric vehicle that is within a percentage threshold of requested charge;

program instructions to stop charge to the identified at least one currently charging electric vehicle;

program instructions to reallocate a portion of capacity of the delivery mechanism in use by the electric vehicle having a stopped charge to the requesting electric vehicle; and program instructions to modify the fixed period of time based on real time use of the delivery mechanism.

16. The computer system of claim 15, wherein the program instructions stored on the one or more computer readable storage media further comprise:

program instructions to add the electric vehicle requesting a charge to a queue of vehicles requesting charge; and program instructions to determine whether the requesting electric vehicle can be granted a reservation to charge in the delivery mechanism.

17. The computer system of claim 16, wherein the program instructions stored on the one or more computer readable storage media further comprise:

program instructions to, in response to determining that the requesting electric vehicle can be granted the reservation to charge in the delivery mechanism, route the requesting electric vehicle to the delivery mechanism.

18. The computer system of claim 15, wherein program instructions to, in response to receiving a request to charge, reserve a portion of capacity of a delivery mechanism for a fixed period of time based on available capacity of a delivery mechanism in the plurality of delivery mechanisms and need of the electric vehicle requesting a charge comprise:

program instructions to identify a delivery mechanism within the area that is along the electric vehicle's current route;

program instructions to determine whether the electric vehicle can be granted a reservation to charge in the identified delivery mechanism; and program instructions to, in response to determining that the electric vehicle cannot be granted a reservation to charge, identify another delivery mechanism along the electric vehicle's current route that can accommodate the electric vehicle requesting charge.

19. The computer system of claim 15, wherein the program instructions stored on the one or more computer readable storage media further comprise:

program instructions to, in response to receiving a request to charge, identify whether the requesting electric vehicle is a priority vehicle.

20. The computer system of claim 15, further comprising:

program instructions to transmit a notification to the identified at least one currently charging electric vehicle that the charge is being stopped; and program instructions to route the identified at least one currently charging electric vehicle to another delivery mechanism.

* * * * *